(12) United States Patent
Tanabe et al.

(10) Patent No.: US 6,433,038 B1
(45) Date of Patent: Aug. 13, 2002

(54) PHOTOCURABLE INK COMPOSITION FOR INK JET RECORDING AND INK JET RECORDING METHOD USING THE SAME

(75) Inventors: Seiichi Tanabe; Kiyohiko Takemoto, both of Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/525,297

(22) Filed: Mar. 14, 2000

(30) Foreign Application Priority Data

Mar. 16, 1999 (JP) .............................. 11-069728
Mar. 24, 1999 (JP) .............................. 11-080470

(51) Int. Cl.$^7$ .................................... C08F 2/50
(52) U.S. Cl. .............................. 522/84; 522/79; 522/71; 522/83; 522/84; 522/90; 522/96; 522/182; 522/122; 523/160; 106/31.13; 106/31.6; 106/31.65
(58) Field of Search ................ 522/79, 71, 81, 522/83, 84, 90, 96, 182; 523/160; 106/31.13, 31.6, 31.65

(56) References Cited

U.S. PATENT DOCUMENTS

| | | | |
|---|---|---|---|
| 4,228,438 A | * 10/1980 | Vazirani | 346/1.1 |
| 4,365,035 A | * 12/1982 | Zabiak | 524/283 |
| 4,559,371 A | * 12/1985 | Husler et al. | 204/158 |
| 4,680,058 A | 7/1987 | Shimizu | 106/23 |
| 5,306,196 A | 4/1994 | Hashiguchi | 439/607 |
| 5,407,474 A | * 4/1995 | Airey et al. | 106/20 C |
| 5,501,942 A | * 3/1996 | Salvin et al. | 430/280.1 |
| 5,587,405 A | * 12/1996 | Tanaka et al. | 522/98 |
| 5,623,001 A | 4/1997 | Figov | 522/84 |
| 6,162,511 A | * 12/2000 | Garnett et al. | 427/514 |

FOREIGN PATENT DOCUMENTS

| | | | |
|---|---|---|---|
| EP | 0337705 | 10/1989 | |
| EP | 0522801 | 1/1993 | |
| EP | 0705890 | 4/1996 | |
| GB | 2303376 | 2/1997 | |
| JP | 03(1991)-216379 | 9/1991 | ............ B41M/5/00 |
| JP | 08(1996)-218018 | 8/1996 | ........... C09D/11/00 |
| WO | 9731071 | 8/1997 | |
| WO | WO-9744140 A1 | * 11/1997 | |

OTHER PUBLICATIONS

JPO Abstract 03(1991)–216379, Sep. 24, 1991.
JPO Abstract 08(1996)–218018, Aug. 27, 1996.

* cited by examiner

Primary Examiner—James J. Seidleck
Assistant Examiner—Sanza L. McClendon
(74) Attorney, Agent, or Firm—Ladas & Parry

(57) ABSTRACT

Disclosed is a photocurable ink composition for use in an ink jet recording method wherein an ink composition is brought into contact with a recording medium followed by a photocuring reaction to perform printing. The photocurable ink composition can offer good coating strength, chemical resistance, dispersion stability, and printing stability. This photocurable ink composition comprises at least a colorant, a urethane oligomer, a monomer having a tri- or higher functional reactive group, a photopolymerization initiator, and an aqueous solvent. After printing the photocurable ink composition, ultraviolet light is applied to cure the print. The colorant is preferably anatase titanium dioxide.

23 Claims, No Drawings

PHOTOCURABLE INK COMPOSITION FOR INK JET RECORDING AND INK JET RECORDING METHOD USING THE SAME

BACKGROUND OF THE INVENTION

1. Field of the Invention

The present invention relates to an ink composition for ink jet recording, and an ink jet recording method using the same.

2. Background Art

Ink jet recording is a printing method wherein droplets of an ink composition are ejected and deposited onto a recording medium, such as paper, to conduct printing. This ink jet recording method has a feature that images having high resolution and high quality can be printed at a high speed. In general, the ink composition used in the ink jet recording comprises an aqueous solvent as again component and, added thereto, a colorant component and a wetting agent, such as glycerin, for preventing clogging.

A component, capable of stably fixing a colorant onto a recording media, into the ink composition is required for printing of the water-base ink composition on papers, cloths and other recording media which are less likely to be penetrable by the ink composition, and plates, films and other recording media produced from metals, plastics and other materials, which are not penetrable by the ink composition, for example, phenol, melamine, vinyl chloride, acryl, and polycarbonate resins. In particular, in the case of printing, for example, on printed wiring boards, rapid drying and good chemical resistance are required of the ink composition.

In order to meet this requirement, an ink composition has been proposed which contains a component of which the molecular weight is increased upon ultraviolet irradiation (for example, Japanese Patent Laid-Open No. 216379/1991). An ultraviolet-curable ink composition comprising a colorant, an ultraviolet-curable curable material, a photopolymerization initiator and the like has also been proposed (for example, U.S. Pat. No. 5,623,001). The claimed advantage of these ink compositions and ink jet recording methods using the same is to yield images having improved quality through the prevention of feathering or bleeding of the ink composition on recording media.

In an ink jet recording method using the ink composition containing a component, of which the molecular weight is increased upon ultraviolet irradiation, the ink composition is deposited on a recording medium followed by ultraviolet irradiation. Upon ultraviolet irradiation, the photopolymerization initiator contained in the ink composition produces radicals or the like which induce polymerization of an oligomer and a monomer contained in the ink composition. This results in curing of the ink composition, permitting the colorant contained in the ink composition to be fixed onto the recording medium. The fixation of the colorant is considered to realize prints which have high coating strength, solvent resistance, and color density and, at the same time, have no significant feathering or bleeding and unevenness. This type of ink composition for ink jet recording is sometimes called a "photocurable ink composition for ink jet recording."

Further, the prevention of a dye as a colorant from being separated, the improvement of scratch/rubbing resistance and printing reliability, the prevention of fathering or bleeding after printing, the enhancement of drying properties of the ink and other purposes, disclosed are an ink for ink jet recording, comprising two liquids, an ink composition containing a colorant and a reaction solution containing a polymerization initiator, and an ink jet recording method wherein printing is carried out using these two liquids on recording media (for example, Japanese Patent Laid-Open Nos. 186725/1993 and 218018/1996).

According to the ink for ink jet recording, comprising two liquids, one of the ink composition and the reaction solution contains a photopolymerization initiator or a photocurable resin. The claimed advantage of using two divided liquids, that is, the ink composition and the reaction solution, is to suppress a dark reaction to enable the storage of the ink composition and the reaction solution for a long period of time and, in addition, to realize prints having excellent lightfastness and heat resistance.

On the other hand, ink jet recording, which involves the formation of a white print on a recording medium, uses an ink composition containing a white pigment as a colorant component. White pigments used in this method include white inorganic pigments, such as oxides, sulfides, sulfates, carbonates and the like of zinc, lead, barium, titanium, and antimony. Titanium oxide is known as a white pigment possessing excellent covering power, coloring power, and chemical resistance.

Further, a nonaqueous white pigment ink composition containing a colorant having a specific particle diameter has been proposed (for example, Japanese Patent Publication No. 45663/1990). The claimed advantage of this ink composition is to realize good dispersibility of the ink composition and good printing stability and to prevent clogging of the recording head in the ink jet recording apparatus, by virtue of the specific particle diameter of the white pigment.

SUMMARY OF THE INVENTION

The present inventors have now found that, in a photocurable ink composition for ink jet recording, the use of a urethane oligomer and a monomer having a tri- or higher functional reactive group can significantly improve coating strength, chemical resistance, dispersion stability, and printing stability. The present inventors have further found that, in the white ink composition for ink jet recording, anatase titanium dioxide, when used as the colorant, can improve the dispersion stability and printing stability of the ink composition. The present inventors have further found that the use of anatase titanium dioxide, a photopolymerization initiator, an oligomer, and a monomer in the photocurable ink composition for ink jet recording can significantly improve, in addition to dispersion stability and printing stability, polymerization efficiency and coating strength. The present invention has been made based on such finding.

Accordingly, it is an object of the present invention to provide an ink composition for ink jet recording, capable of realizing good ink jet recording and good images, and to provide an ink jet recording method using this ink composition.

According to a first aspect of the present invention, there is provided a photocurable ink composition for ink jet recording, comprising at least a colorant, a urethane oligomer, a monomer having a tri- or higher functional reactive group, a photopolymerization initiator, and an aqueous solvent.

According to a second aspect of the present invention, there is provided a white ink composition for ink jet recording, comprising at least anatase titanium dioxide and an aqueous solvent.

According to a third aspect of the present, invention, there is provided a photocurable white ink composition for ink jet recording, comprising at least anatase titanium dioxide, a photopolymerization initiator, an oligomer, a monomer, and an aqueous solvent.

DESCRIPTION OF THE PREFERRED EMBODIMENTS

Ink Competition According to First Aspect of Invention

The photocurable ink composition for ink jet recording according to the first aspect of the present invention comprises at least a colorant, a urethane oligomer, a monomer: having a tri- or higher functional reactive group, a photopolymerization initiator, and an aqueous solvent. The ink composition according to the first aspect of the present invention has high storage stability, can realize stable printing in ink jet recording, and can yield images having excellent coating strength and chemical resistance. The reason why this advantage can be obtained has not been fully elucidated yet, the reason is believed to reside, in that the urethane oligomer has high compatibility with the monomer having a tri- or higher functional reactive group and can stably dissolve or disperse other ingredients constituting the ink composition.

Urethane oligomer

The ink composition according to the first aspect of the present invention contains a urethane oligomer. The urethane oligomer according to the present invention refers to an oligomer having in its molecule at least one urethane bond and at least one radically polymerizable unsaturated double bond. The oligomer refers to a molecule with a medium relative molecular mass (having the same meaning as molecular weight) which has a structure constituted by repetition of units obtained substantially or conceptually from molecules having a low relative molecular mass a small number of times, generally about 2 to 20 times. Further, the oligomer used in the present invention is called "photopolymerizable prepolymer," "base resin," or "acrylic oligomer."

The urethane oligomer according to the present invention has one to several acryloyl groups as the functional group and thus causes a polymerization reaction with the monomer or the like upon ultraviolet irradiation or the like to form a crosslinked polymer.

Urethane oligomers usable in the present invention include oligomers produced by an addition reaction of a polyol with a polyisocyanate and a polyhydroxy compound and, in addition, those which may be classified, according to molecular structure constituting the skeleton, into polyester urethane acrylates, polyether urethane acrylates, polybutadiene urethane acrylates, and polyol urethane acrylates.

The urethane oligomer according to the present invention generally has a molecular weight of about 500 to 20,000, preferably about 500 to 10,000.

The content of, the urethane oligomer in the ink composition according to the present invention is generally about 1 to 50% by weight, preferably about 3 to 30% by weight.

The ink composition according to the first aspect of the present invention contains a monomer having a tri- or higher functional reactive group. The monomer having a tri- or higher functional reactive group according to the present invention refers to a monomer having in its basic structure three or more radically polymerizable unsaturated double bonds, preferably acryloyl groups. The term "monomer" used herein refers to a molecule which can constitute constituent units of the basic structure of a polymer. The monomer according to the present invention is also called a "photopolymerizable monomer," and examples thereof include tri- or higher functional polyfunctional acrylates.

According to a preferred embodiment of the present invention, the monomer having a tri- or higher functional reactive group is an acrylate monomer which has trimethylolpropane represented by formula (I), pentaerythritol represented by formula (II), or dipentaerythritol represented by formula (III) as a basic structure and at least three acryloyl groups:

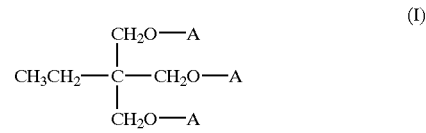

wherein
A represents $CH_2=CHC(O)$ or $CH_2=CHC(O)R_n$, wherein R represents a straight-chain or branched alkoxyl group having 1 to 5 carbon atoms, preferably an ethoxy or propoxy group, and n represents the number of repetitions of R and is 1 to 10;

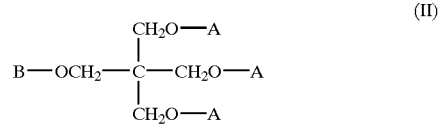

wherein
A represents H, $CH_2=CHC(O)$, or $CH_2=CHC(O)R_n$, wherein R represents a straight-chain or branched alkoxyl group having 1 to 5 carbon atoms, preferably an ethoxy or propoxy group, and n represents the number of repetitions of R and is 1 to 10 and
B represents H, $CH_2=CHCO$, or a higher acyl group having 1 to 5 carbon atoms,
provided that at least three out of all substituents of A and B comprise an acryloyl group; and

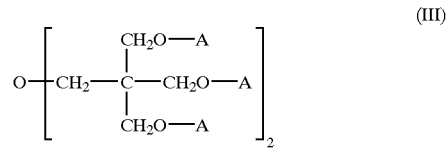

wherein
A represents H, $CH_2=CHC(O)$, or $CH_2=CHC(O)R_n$, wherein R represents a straight-chain or branched alkoxyl group having 1 to 5 carbon atoms, preferably an ethoxy or propoxy group, or a lactone having 1 to 5 carbon atoms, preferably ε-caprolactone, and n represents the number of repetitions of R and is 1 to 10, and
B represents H, $CH_2=CHCO$, or a higher acyl group having 1 to 5 carbon atoms,
provided that at least three out of all substituents of A comprise an acryloyl group.

The monomer in the ink composition according to the first aspect of the present invention has a structure of an acrylate of a low-molecular polyol and advantageously cures rapidly.

Specific examples of monomers usable in the ink composition according to the first aspect of the present invention include glyceryl triacrylate, trimethylolpropane triacrylate, pentaerythritol triacrylate, dipentaerythritol hexaacrylate, dipentaerythritol polyacrylate (those having 3 or more acryloyl groups), and isocyanurate triacrylate. Among them, dipentaerythritol polyacrylate and dipentaerythritol polyacrylate (those having 3 or more acryloyl groups) are preferred.

According to the present invention, the molecular weight of the monomer is generally about 200 to 3,000, preferably about 300 to 2,000.

The content of the monomer in the ink composition according to the first aspect of the present invention is about 1 to 50% by weight, preferably about 3 to 30% by weight.

The oligomer is copolymerized with a monomer to form a three-dimensional structure. Therefore, the content of the oligomer or the monomer in the ink composition according to the present invention should be determined by taking into consideration the polymerization efficiency, the polymerization speed, the resistance to shrinkage after polymerization, the polymer coating strength and the like. Specifically, in the ink composition according to the present invention, the content ratio of the urethane oligomer to the monomer having a tri- or higher functional reactive group is approximately in the range of 95:5 to 40:60, preferably approximately in the range of 90:10 to 50:50.

Photopolymerization initiator

The ink composition according to the first aspect of the present invention contains a photopolymerization initiator. The photopolymerization initiator absorbs, for example, ultraviolet light with wavelengths of about 250 to 450 nm to produce radicals or ions which initiate the polymerization of the oligomer and the monomer.

Representative examples of photopolymerization initiators usable in the present invention include benzoin methyl ether, benzoin ethyl ether, isopropyl benzoin ether, isobutyl benzoin ether, 1-phenyl-1,2-propanedione-2-(o-ethoxycarbonyl)oxime, benzyl, diethoxyacetophenone, benzophenone, chlorothioxanthone, 2-chlorothioxanthone, isopropylthioxanthone, 2-methylthioxanthone, polyphenyl polychloride, and hexachlorobenzene. Among them, isobutyl benzoin ether and 1-phenyl-1,2-propanedione-2-(o-ethoxycarbonyl)oxime are preferred.

Commercially available photopolymerization initiators under tradename designations of Vicure 10, 30 (manufactured by Stauffer Chemical), Irgacure 184, 651, 2959, 907, 369, 1700, 1800, 1850, 819 (manufactured by Ciba Specialty Chemicals, K.K.), Darocure 1173 (manufactured by EM Chemical), Quantacure CTX, ITX (manufactured by Aceto chemical), and Lucirin TPO (manufactured by BASF) may also be used.

Colorant

The colorant contained in the ink composition according to the first aspect of the present invention may be a pigment dispersible in water and/or a dye dispersible in water.

The pigment may be either an inorganic pigment or an organic pigment. Inorganic pigments usable herein include, in addition to titanium oxide and iron, oxide, carbon blacks produced by known processes, such as contact, furnace, and thermal processes.

Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

Dyes usable herein include, dispersible dyes usable for ink jet recording.

According to a preferred embodiment of the present invention, the colorant is preferably anatase titanium dioxide. The ink composition containing anatase titanium dioxide has an advantage over the ink composition containing titanium dioxide having other crystal a structures, such as rutile titanium dioxide and brookite titanium dioxide, in that the dispersion stability of the ink composition can be improved. Further, the ink composition containing anatase titanium dioxide according to the present invention, when used in ink jet recording, can realize stable printing and good images.

The particle diameter of the anatase titanium dioxide as the colorant is preferably about not more than 2.0 $\mu$m, particularly preferably not more than 0.2 $\mu$m. The anatase titanium dioxide having particle diameters falling within the above range can be considered to improve the dispersibility of the ink composition.

The term "particle diameter" used herein means 50% particle diameter in terms of volume. The "50% particle diameter in terms of volume" refers to such a diameter that, for the particle size distribution of a population of a titanium dioxide powder, corresponds to 50% of a cumulative curve on particle diameter prepared with the total volume of a population of the, titanium dioxide powder being presumed to be 100%.

The amount of the colorant added to the ink composition according to the present invention is preferably 1 to 50% by weight, more preferably about 2 to 30% by weight.

According to the ink composition of the present invention, if necessary, two or more dyes and/or pigments may be used as the colorant.

According to a preferred embodiment, of the present invention, the colorant is added, to the ink composition, as a colorant dispersion prepared by dispersing a colorant in an aqueous medium with the aid of a dispersant or a surfactant. Preferred dispersants usable herein include dispersants commonly used in the preparation of colorant dispersions, for example, polymeric dispersants. It will be apparent to a person having ordinary skill in the art that the dispersant and the surfactant contained in the colorant dispersion serves also as the dispersant and the surfactant in the ink composition.

Aqueous solvent and other ingredients

According to the ink composition of the present invention, the aqueous solvent, preferably comprises water and a water soluble organic solvent. Water may be pure water obtained by ion exchange, ultrafiltration, reverse osmosis, distillation or the like, or ultrapure water. Further, water, which has been sterilized by ultraviolet irradiation or by addition of hydrogen peroxide or the like, is suitable because, when the ink composition is stored for a long period of time, it can prevent the growth of mold or bacteria.

The water-soluble organic solvent is preferably a low-boiling organic solvent, and specific examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink composition. The amount of the low-boiling organic solvent added is preferably in the range of from 0.1 to 10% by weight, more preferably in the range of from 0.5 to 5% by weight, based on the ink composition.

According to a preferred embodiment of the present invention, the ink composition further contains a wetting agent comprising a high-boiling organic solvent. Specific examples of preferred high-boiling organic solvents, usable herein include: polyhydric alcohols, such as ethylene glycol, diethylene glycol, triethylene glycol, polyethylene glycol, polypropylene glycol, propylene glycol, butylene glycol 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol, monoethyl ether, and triethylene glycol monobutyl ether; urea; 2-pyrrolidone; N-methyl-2-pyrrolidone; and 1,3-dimethyl-2-imidazolidinone.

The amount of the wetting agent added is preferably 0.5 to 40% by weight, more preferably 2 to 20% by weight, based on the ink composition.

According to a preferred embodiment of the present invention, the ink composition further contains a saccharide. Specific examples of saccharide usable herein include monosaccharides, disaccharides, oligosaccharides (including trisaccharides and tetrasaccharides), and other polysaccharides, preferably. glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including, substances which exist widely in the world of nature, such as alginic acid, α-cyclodextrin, and cellulose. Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is generally 0.1 to 40% by weight, preferably 0.5 to 30% by weight, based on the ink composition.

The ink composition of the present invention may a contain a surfactant. Specific examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). Further, acetylene glycol (OLFINE Y and Surfynol 82, 104, 440, 465, and 485 (all the above products being manufactured by Air Products and Chemicals Inc.) may also be used. They may be used alone or in combination of two or more.

If necessary, polyvalent metal salts, polyallylamines or derivatives thereof, resin emulsions, inorganic oxide colloids, wetting agents, pH adjustors, preservatives, anti-molds and the like may be added to the ink composition of the present invention.

Process for producing ink composition according to first aspect of invention

The process for producing the ink composition for ink jet recording according to the first aspect of the present invention comprises the steps of dissolving or dispersing a monomer having a tri- or higher functional reactive group in a urethane oligomer; and then adding a colorant, a photopolymerization initiator, and an aqueous solvent to the solution or the dispersion.

The ink composition for ink jet recording produced by the production process according to the present invention has high storage stability, has excellent printing stability at the time of ink jet recording, and can yield prints having excellent coating strength and chemical resistance on recording media.

In the process for producing the ink composition according to the first aspect of the present invention, a urethane oligomer is first mixed with a monomer having a tri- or higher functional reactive group to prepare a highly compatible dispersion or solution. According to a preferred embodiment of the present invention, the dispersion or the solution may be prepared by slowly dropwise adding the monomer having a tri- or higher functional reactive group to the urethane oligomer while stirring the urethane oligomer.

After the preparation of the dispersion or solution comprising the urethane oligomer and the monomer having a trio or higher functional reactive group, a colorant, a photopolymerization initiator, an aqueous solvent, and optional ingredients are added to the dispersion or the solution. According to a preferred embodiment of the present invention, the addition of the above ingredients to the dispersion or the solution is preferably carried out under light (particularly ultraviolet) shielded conditions from the viewpoint of avoiding such a phenomenon that the oligomer and the monomer are polymerized through the action of the photopolymerization initiator.

A stirrer commonly used in the production of ink compositions may be used in the production process of the ink composition according to the present invention.

Ink Composition According to Second Aspect of Invention

The white ink composition for ink jet recording according to the second aspect of the present invention comprises at least anatase titanium dioxide and an aqueous solvent.

Titanium dioxide

The ink composition containing anatase titanium dioxide according to the present invention has an advantage over the ink composition containing titanium dioxide having other crystal structures, such as rutile titanium dioxide and brookite titanium dioxide, in that the resin can be efficiently cured. Further, the ink composition containing anatase titanium dioxide according to the present invention has excellent dispersion stability and, when used in ink jet recording, can advantageously realize stable printing and good images.

The particle diameter of the anatase titanium dioxide used in the ink composition according to the present invention may be the same as that described above in connection with the ink composition according to the first aspect of the present invention. The preferred particle diameter may also be the same as that described above in connection with the ink composition according to the first aspect of the present invention.

The amount of the anatase titanium dioxide added to the ink composition is preferably about 1 to 50% by weight, more preferably about 3 to 30% by weight.

The ink composition according to the second aspect of the present invention: contains at least anatase titanium dioxide. The ink composition may further contain other colorants, such as dyes and pigments, and dispersants or surfactants. The other colorants, such as dyes or pigments, and the dispersants or the surfactants may be the same as those described above in connection with the ink composition according to the first aspect of the present invention.

Aqueous solvent and other ingredients

Aqueous solvents and other ingredients usable in the ink composition according to the second aspect of the present invention may be the same as those described above in connection with the ink composition according to the first aspect of the present invention. Preferred aqueous solvents and other ingredients may also be the same as those described above in connection with the ink composition according to the first aspect of the present invention. When the ink composition according to the second aspect of the present invention contains an aqueous solvent and other ingredients, the contents thereof may be the same as those described above in connection with the ink composition according to the first aspect of the present invention.

Ink Composition According to Third Aspect of Invention

The photocurable white ink composition for ink jet recording according to the third aspect of the present invention comprises at least anatase titanium dioxide, a photopolymerization initiator, an oligomer, a monomer, and an aqueous solvent.

Titanium dioxide

The ink composition containing anatase titanium dioxide according to the present invention has an advantage over the ink composition containing titanium dioxide having other crystal structures, such as rutile titanium dioxide and brookite titanium, dioxide, in that the resin can be efficiently cured. Further, the ink composition containing anatase titanium dioxide according to the present invention has excellent dispersion stability and, when used in ink jet recording, can advantageously realize stable printing and good images.

The particle diameter of the anatase titanium dioxide used in the ink composition according to the third aspect of the present invention may be the same as that described above in connection with the ink composition according to the first aspect of the present invention. The preferred particle diameter may also be the same as that described above in connection with the ink composition according to the first aspect of the present invention.

The amount of the anatase titanium dioxide added to the ink composition is preferably about 1 to 50% by weight, more preferably about 3 to 30% by weight.

The ink composition according to the third aspect of the present invention contains at least anatase titanium dioxide. The ink composition may further contain other colorants, such as dyes and pigments, and dispersants or surfactants. The other colorants, such as dyes or pigments, and the dispersants or the surfactants may be the same as those described above in connection with the ink composition according to the first aspect of the present invention.

Photopolymerization initiator

The ink composition according to the third aspect of the present invention contains a photopolymerizatin initiator. The photopolymerization initiator may be the same as that described above in connection with the first aspect of the present invention.

The ink composition according to the third aspect of the present invention contains an oligomer. The oligomer refers to a molecule with a medium relative molecular mass which has a structure constituted by repetition of units obtained substantially or conceptually from molecules having a low relative molecular mass, a small number of times, generally about 2 to 20 times. Further, the oligomer used in the present invention is called "photopolymerizable prepolymer," "base resin," "or acrylic oligomer."

The oligomer according to the third aspect of the present invention has one to several acryloyl groups as the functional group and thus causes a polymerization reaction with the monomer or the like upon ultraviolet irradiation or the like to form a crosslinked polymer.

Oligomers usable in the third aspect of the present invention may be classified, for example, according to molecular structure constituting the skeleton, into polyester acrylates, polyurethane acrylates, epoxy acrylates, polyether acrylates, oligoacrylates, alkyd acrylates, and polyol acrylates. Among them, polyester acrylates and polyurethane acrylates are preferred with polyurethane acrylates being particularly preferred.

The molecular weight of the oligomer used in the third aspect of the present invention is generally about 5,000 to 20,000, preferably about 500 to 10,000.

The content of the oligomer in the ink composition according to the third aspect of the present invention is about 1 to 50% by weight, preferably about 3 to 30% by weight.

Monomer

The ink composition according to the third aspect of the present invention contains a monomer. The term "monomer" used herein refers to a molecule which can constitute constituent units of the basic structure of a polymer. The monomer used in the ink composition according to the third aspect of the present invention is also called a "photopolymerizable monomer," and examples thereof include monofunctional acrylates and polyfunctional acrylates. According to a preferred embodiment of the present invention, the monomer may be the monomer having a tri- or higher functional reactive group described above in connection with the ink composition according to the first aspect of the present invention. This monomer has a structure of an acrylate of a low-molecular polyol and advantageously has low viscosity and can cure rapidly.

Preferred examples of monomers usable in the ink composition according to the third aspect of the present invention include diethylene glycol diacrylate, neopentyl glycol diacrylate, 1,6-hexanediol diacrylate, hydroxypiperic ester neopentyl glycol diacrylate, trimethylolpropane triacrylate, pentaerythritol triacrylate, dipentaerythritol hexaacrylate, acryloyl morpholine, 2-phenoxyethyl acrylate, (2,2,2-triacryloyloxymethyl)ethyl hydrogenphthalate, dipentaerythritol polyacrylate, and dipentaerythritol polyacrylate. Among them, acryloyl morpholine, 2-phenoxyethyl acrylate, (2,2,2-triacryloyloxymethyl)ethyl hydrogenphthalate, dipentaerythritol polyacrylate, and dipentaerythritol polyacrylate are more preferred.

The molecular weight of the monomer used in the ink composition according to the third aspect of the present invention is about 100 to 3,000, preferably about 100 to 2,000.

The content of the monomer in the ink composition according to the third aspect of the present invention is about 1 to 70% by weight, preferably about 3 to 50% by weight.

The oligomer is copolymerized with a monomer to form a, three-dimensional structure. Therefore, the content of the oligomer or the monomer in the ink composition according to the present invention should be determined by taking into consideration the polymerization efficiency, the polymerization speed, the resistance to shrinkage after polymerization, the polymer coating strength and the like.

Aqueous solvent and other ingredients

Aqueous solvents and other ingredients usable in the ink composition according to the third aspect of the present invention may be the same as those described above in connection with the ink composition according to the first aspect of the present invention. Preferred aqueous solvents and other ingredients may also be the same as those described above in connection with the ink composition according to the first aspect of the present invention. When the ink composition according to the third aspect of the present invention contains an aqueous solvent and other ingredients, the contents thereof may be the same as those described above in connection with the ink composition according to the first aspect of the present invention.

Ink jet recording method

The ink jet recording method according to one embodiment of the present invention comprises printing, on a recording medium, a photocurable ink composition for ink jet recording, comprising at least a colorant, a urethane oligomer, a monomer having a tri- or higher functional reactive group, a photopolymerization initiator, and an aqueous solvent.

The ink jet recording method according to this embodiment of the present invention, by virtue of the use of the photocurable ink. composition for ink jet recording in printing, can realize good image quality and good prints.

The ink jet recording method according to another embodiment of the present invention comprises the steps of: forming droplets of a white ink composition for ink jet recording, comprising at least anatase titanium dioxide and an aqueous solvent; and depositing the droplets onto a recording medium to perform printing.

The ink jet recording method according to a further embodiment of the present invention comprises the steps of: forming droplets of a photocurable ink composition for ink jet recording, comprising at least anatase titanium dioxide, a photopolymerization initiator, an oligomer, a monomer, and an aqueous solvent; and depositing the droplets onto a recording medium to perform printing.

In the ink jet recording method according to the present invention, the ink composition is deposited on a recording medium followed by light irradiation. The applied light permits the photopolymerization initiator to produce radicals and the like which initiate a polymerization reaction of a oligomer (for example, a urethane oligomer) and a monomer (for example, a monomer having a tri- or higher functional reactive group), permitting a colorant (for example, anatase titanium dioxide) contained in the ink composition to be fixed onto the recording medium. It is considered that this can realize the formation of prints having high sharpness and excellent coating strength and chemical resistance even on the surface of media not penetrable by an aqueous medium, such as metals and plastics. The light irradiation may be visual light irradiation or ultraviolet irradiation with ultraviolet irradiation being particularly preferred.

According to a preferred embodiment of the present invention when ultraviolet irradiation is used, the dose is not less than 100 mJ/cm$^2$, preferably not less than 500 mJ/cm$^2$, and not more than 10,000 mJ/cm$^2$, preferably not more than 5,000 mJ/cm$^2$. The dose of the ultraviolet light in the above range causes a satisfactory curing reaction. Further, the ultraviolet irradiation can advantageously prevent the fading of the colorant.

Lamps usable for the ultraviolet irradiation include metal halide lamps, xenon lamps, carbon arc lamps, chemical lamps, low-pressure mercury lamps, and high-pressure mercury lamps. For example, commercially available lamps, such as H lamp, D lamp, and V lamp manufactured by Fusion System, may be used.

Further, in the ink jet recording method according to the present invention, heating may be carried out simultaneously with or after the light irradiation when the ink composition containing an aqueous solvent as an optional ingredient is deposited onto a recording medium, the removal of water remaining in the recording medium particularly by heating means can improve the efficiency of the polymerization reaction. This can enhance the fixation of prints on the recording medium and can improve the coating strength and the chemical strength of the prints.

Examples. of methods usable for heating include a method wherein a heat source is brought into contact with the recording medium, and a method wherein the recording medium is heated without contact with a heat source, for example, a method wherein infrared radiation, microwave (electromagnetic radiation having a maximum wavelength at about 2,450 MHz,) or the like is applied to the recording medium, or alternatively hot air is blown against the recording medium.

EXAMPLES

The present invention will be described in more detail with reference to the following examples, though it is not limited to these examples only.

Preparation of Ink Composition a

Example 1a

Aqueous dispersion of titanium oxide (pigment content 30% by weight) 33 wt %
Urethane oligomer (aqueous dispersion of urethane oligomer; NR-445, manufactured by Zeneca K.K.) 34 wt %
Monomer (dipentaerythritol polyacrylate, A-9530, manufactured by Shin-Nakamura Chemical Co., Ltd.) 1.5 wt %
Photopolymerization initiator (Irgacure 1700, manufactured by Ciba Specialty Chemicals, K.K.) 1.5 wt %
Water 30 wt %

Example 2a

Aqueous dispersion of titanium oxide (pigment content 30% by weight) 33 wt %
Urethane oligomer (aqueous dispersion of urethane oligomer; NR-445, manufactured by Zeneca K.K.) 26 wt %
Monomer (dipentaerythritol polyacrylate, A-9530, manufactured by Shin-Nakamura Chemical Co., Ltd.) 4.5 wt %
Photopolymerization initiator (Irgacure 1700, manufactured by Ciba Specialty Chemicals, K.K.) 1.5 wt %
Water 35 wt %

Example 3a

Aqueous dispersion of titanium oxide (pigment content 30% by weight) 33 wt %
Urethane oligomer (aqueous dispersion of urethane oligomer; NR-445, manufactured by Zeneca K.K.) 19 wt %
Monomer (dipentaerythritol polyacrylate, A-9530, manufactured by Shin-Nakamura Chemical Co., Ltd.). 7.5 wt %
Photopolymerization initiator (Irgacure 1700, manufactured by Ciba Specialty Chemicals, K.K.) 1.5 wt %
Water 39 wt %

Example 4a

Aqueous dispersion of carbon black (pigment content 30% by weight) 33 wt %
Urethane oligomer (aqueous dispersion of urethane oligomer; NR-445, manufactured by Zeneca K.K.) 26 wt %
Monomer (dipentaerythritol polyacrylate, A-9530, manufactured by Shin-Nakamura Chemical Co., Ltd.) 4.5 wt %
Photopolymerization initiator (Irgacure 1700, manufactured by Ciba Specialty Chemicals, K.K.) 1.5 wt %
Water 35 wt %

Example 5a

Aqueous dispersion of titanium oxide (pigment content 30% by weight) 33 wt %
Urethane oligomer (aqueous dispersion of urethane oligomer; NR-445, manufactured by Zeneca K.K.) 34 wt %
Monomer (β-methacryloyloxyethyl hydrogenphthalate; CB-1, manufactured by Shin-Nakamura Chemical Co., Ltd.) 1.5 wt %

Photopolymerization initiator (Irgacure 1700, manufactured by
Ciba Specialty Chemicals, K.K.) 1.5 wt %
Water 30 wt %
Evaluation test Each of the ink compositions prepared in Examples 1a to 5a was loaded into a recording head of an ink jet recording apparatus, and then deposited on a print board as a recording medium to perform printing. Thereafter, the print was dried at 50° C. for 10 min, and the irradiated with ultraviolet light at a dose of 2,000 mJ/cm$^2$.

The ink jet recording apparatus used was an ink jet printer MJ-510C (manufactured by Seiko Epson Corporation). A metal halide type irradiation lamp was used for the ultraviolet irradiation (wavelength 365 nm).

The ink compositions and the prints formed on the recordings medium were evaluated by the following tests.

Evaluation 1a: Storage stability

The ink compositions were allowed to stand at 50° C. for 10 days Thereafter, 50% particle diameter in terms of volume (colorant) was measured, and evaluated.

Here, the "50% particle diameter in terms of volume" refers to such a diameter that, for the particle size distribution of a population of a colorant powder, corresponds to 50% of a cumulative curve on particle diameter prepared with the total volume of a population of the colorant powder being presumed to be 100%.

Evaluation 2a: Pencil hardness

For the prints formed on the recording medium, the hardness was evaluated according to the method specified in JIS K 5400 (Hand Scratch Method in Pencil Scratch Test).

Evaluation 3a: Chemical resistance

The prints, formed on the recording medium were immersed in ethanol for 5 min. Thereafter, the prints were taken out of ethanol, and a toothbrush was reciprocated on each of the prints five times. The results were evaluated according to the following criteria.

A: The print was not separated at all from the recording medium.

B: The print was partially separated from the recording medium.

C: The print was entirely separated from the recording medium.

The ratio of the urethane oligomer to the monomer and the total content of the urethane oligomer and the monomer in the ink composition were as shown in Table 1 below. For the ink compositions prepared in Examples 1a to 5a, the results of the tests were as shown in Table 2 below.

TABLE 1

| | Ratio | | Total content, wt % |
|---|---|---|---|
| | Urethane oligomer | Monomer | Urethane oligomer + monomer |
| Ex. 1a | 10 | 90 | 15 |
| Ex. 2a | 30 | 70 | 15 |
| Ex. 3a | 50 | 50 | 15 |
| Ex. 4a | 50 | 50 | 15 |
| Ex. 5a | 10 | 90 | 15 |

TABLE 2

| | Evaluation 1a | | | |
|---|---|---|---|---|
| | Initial $\mu$m | After standing $\mu$M | Evaluation 2a | Evaluation 3a |
| Ex. 1a | 0.18 | 0.22 | 3H | B |
| Ex. 2a | 0.19 | 0.18 | 4H | A |
| Ex. 3a | 0.19 | 0.20 | 4H | A |
| Ex. 4a | 0.10 | 0.10 | 4H | A |
| Ex. 5a | 0.18 | 1.21 | F | C |

Preparation of Ink Composition b

Example 1b

Aqueous dispersion of anatase titanium dioxide (pigment content=30% by weight, 50% particle diameter in terms of volume=0.16 $\mu$m) 33 wt %
Ethylene glycol 10 wt %
Water 57 wt %

Example 2b

Aqueous dispersion of anatase titanium dioxide (pigment content=30% by weight, 50% particle diameter in terms of volume=0.16 $\mu$m) 33 wt %
Photopolymerization initiator (Irgacure 1700, manufactured by Ciba Specialty chemicals, K.K.) 1.5 wt %
Oligomer (aqueous dispersion of urethane oligomer; NR-445, manufactured by Zeneca K.K.) 34 wt %
Monomer (dipentaerythritol polyacrylate, A-9530, manufactured by Shin-Nakamura Chemical Co., Ltd.) 1.5 wt %
Ethylene glycol 5 wt %
Water 25 wt %

Example 3b

Aqueous dispersion of rutile titanium dioxide (pigment content=30% by weight, 50% particle diameter in terms of volume=0.35 $\mu$m) 33 wt %
Photopolymerization initiator (Irgacure 1700, manufactured by Ciba Specialty Chemicals, K.K.) 1.5 wt %
Oligomer (aqueous dispersion of urethane oligomer; R-445, manufactured by Zeneca K.K.) 34 wt %
Monomer (dipentaerythritol polyacrylate, A-9530, manufactured by Shin-Nakamura Chemical Co., Ltd.) 1.5 wt %
Ethylene glycol 5 wt %
Water 25 wt %
Evaluation Test b Each of the ink compositions prepared in Examples 1b to 3b was loaded into a recording-head of an ink jet recording apparatus, and then deposited on a print board as a recording medium to perform printing. Thereafter, the print was dried at 50° C. for 10 min, and then irradiated with ultraviolet light.

The ink jet recording apparat unused was an ink jet printer MJ-510C (manufactured by Seiko Epson Corporation). A metal halide type irradiation lamp was used for the ultraviolet irradiation (wavelength 365 nm).

The ink compositions and the prints formed on the recording medium were evaluated by the following tests.

Evaluation 1b: Dispersion stability

The ink compositions were allowed to stand at 50° C. for 10 days, and then inspected for sediment.

Evaluation 2b: Pencil hardness

For the prints formed on the recording medium, the hardness was evaluated according to JIS K 5400 (Hand Scratch Method in Pencil Scratch Test).

In this case, the ultraviolet irradiation were carried out on three dose levels of 1,000 mJ/cm², 2,000 mJ/cm², and 4,000 mJ/cm².

Evaluation 3b: Printing stability

Each of the ink compositions was loaded into a recording head of an ink jet recording apparatus, and a pattern, in which characters and graphics intermingled, was printed on 200 sheets of papers of size A4 as a recording medium. At that time, the number of times of dropout was counted.

The type and particle diameter of titanium dioxide used in Examples 1b to 3b were as summarized in Table 3. For the ink compositions prepared in Examples 1b to 3b, the results of the tests were as summarized in Table 4.

TABLE 3

|  | Type of titanium dioxide | 50% Particle diameter in terms of volume |
| --- | --- | --- |
| Ex. 1b | Anatase titanium dioxide | 0.16 μm |
| Ex. 2b | Anatase titanium dioxide | 0.16 μm |
| Ex. 3b | Rutile titanium dioxide | 0.35 μm |

TABLE 4

| | Evaluation 1b | Evaluation 2b Dose of ultraviolet light, mJ/cm² | | | Evaluation 3b Number of times |
| --- | --- | --- | --- | --- | --- |
| | Sediment | 1,000 | 2,000 | 4,000 | of dropout |
| Ex. 1b | Absent | | | | 0 |
| Ex. 2b | Absent | 3H | 4H | 5H | 2 |
| Ex. 3b | Present | 1H | 2H | 4H | 35 |

What is claimed is:

1. A photocurable ink composition for ink jet recording, comprising a colorant, a urethane oligomer, a monomer having a tri- or higher functional reactive group, a photopolymerization initiator, and an aqueous solvent comprising water and a water soluble organic solvent.

2. The ink composition according to claim 1, which has a colorant content of 1 to 50% by weight.

3. The ink composition according to claim 1, wherein the colorant is anatase titanium dioxide.

4. The ink composition according to claim 3, wherein the anatase titanium dioxide has a particle diameter of not more than. 0.2 μm.

5. The ink composition according to claim 1, which has a urethane oligomer content of 1 to 50% by weight.

6. The ink composition according to claim 1, wherein the content of the monomer having a tri- or higher functional reactive group is 1 to 50% by weight.

7. The ink composition according to claim 1, wherein the monomer having a tri- or higher functional reactive group is an acrylate monomer which has trimethylolpropane represented by formula (I) as a basic structure and at least three acryloyl groups:

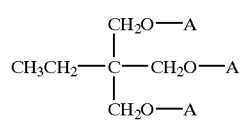

(I)

wherein
A represents $CH_2=CHC(o)$ or $CH_2=CHC(O)R_n$ wherein R represents a straight-chain or branched alkoxyl group having 1 to 5 carbon atoms and n represents the number of repetitions of R and is 1 to 10.

8. The ink composition according to claim 1, wherein the monomer having a tri- or higher functional reactive group is an acrylate monomer which has pentaerythritol represented by formula (II) as a basic structure and at least three acryloyl groups:

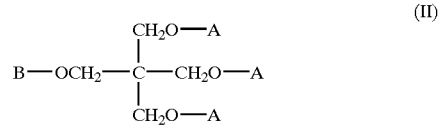

(II)

wherein
A represents H $CH_2=CHC(O)$, or $CH_2=CHC(O)R_n$ wherein R represents a straight-chain or branched alkoxyl group having 1 to 5 carbon atoms and n represents the number of repetitions of R and is 1 to 10; and B represents H, $CH_2=CHCO$, or a higher acyl group having 1 to 5 carbon atoms, provided that at least three out of all substituents of A and B comprise an acryloyl group.

9. The ink composition according to claim 1, wherein the monomer having a tri- or higher functional reactive group is an acrylate monomer which has dipentaerythritol represented by formula (III) as a basic structure and at least three acryloyl groups:

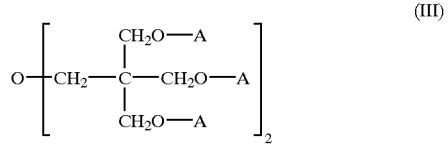

(III)

wherein
A represents H, $CH_2=CHC(O)$, or $CH_2=CHC(O)R_n$ wherein R represents a straight-chain or branched alkoxyl group having 1 to 5 carbon atoms or a lactone having 1 to 5 carbon atoms and n represents the number of repetitions of R and is 1 to 10; and B represents H, $CH_2=CHCO$, or a higher acyl group having 1 to 5 carbon atoms, provided that at least three out of all substituents of A comprise an acryloyl group.

10. A process for producing the ink composition according to claim 1, comprising the steps of:
dissolving or dispersing a monomer having a tri- or higher functional reactive group in a urethane oligomer; and
then adding a colorant, a photopolymerization initiator, and an aqueous solvent comprising water and a water soluble organic solvent to the solution or the dispersion.

11. A white ink composition for ink jet recording, comprising at least anatase titanium dioxide and an aqueous solvent comprising water and a water soluble organic solvent.

12. The ink composition according to claim 11, wherein the anatase titanium dioxide has a particle diameter of not more than 0.22 μm.

13. The ink composition according to claim 11, wherein the content of the anatase titanium dioxide is 1 to 50% by weight.

14. A photocurable white ink composition for ink jet recording, comprising anatase titanium dioxide, a photopolymerization initiator, an oligomer, a monomer, having a tri- or higher functional reactive group and an aqueous solvent comprising water and a water soluble organic solvent.

15. The ink composition according to claim 14, wherein the anatase titanium, dioxide has a particle diameter of not more than 0.2 μm.

16. The ink composition according to claim 14, wherein the content of the anatase titanium dioxide is 1 to 50% by weight.

17. The ink composition according to claim 14 to 16, wherein the content of the oligomer is 1 to 50% by weight.

18. The ink composition according to claim 14, wherein the content of the monomer is 1 to 70% by weight.

19. An ink jet recording method comprising the step of depositing droplets of an ink composition onto a recording medium to perform printing, wherein the ink composition is one according to claim 1.

20. The recording method according to claim 19, wherein a curing reaction is carried out after the deposition of the droplets of the ink composition onto the recording medium.

21. The recording method according to claim 20, wherein the curing reaction is carried out by ultraviolet irradiation.

22. The recording method according to claim 21, wherein the ultraviolet irradiation is carried out at a dose of 100 to 10,000 $mJ/cm^2$.

23. A record produced by the recording method according to claim 19.

* * * * *